(12) United States Patent
Nagata et al.

(10) Patent No.: US 6,657,688 B2
(45) Date of Patent: Dec. 2, 2003

(54) LIQUID CRYSTAL DISPLAY DEVICE WITH REFLECTOR FORMING PART OF CAPACITY ELEMENT

(75) Inventors: Tetsuya Nagata, Mobara (JP); Toshio Miyazawa, Chiba (JP); Hiroshi Saito, Mobara (JP); Shinichi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 09/870,750

(22) Filed: Jun. 1, 2001

(65) Prior Publication Data

US 2002/0018152 A1 Feb. 14, 2002

(30) Foreign Application Priority Data

Jun. 2, 2000 (JP) .......................... 2000-166201

(51) Int. Cl.[7] ..................... G02F 1/1335; G02F 1/1343; G02F 1/136; G02F 1/1333; H01L 29/04
(52) U.S. Cl. ...................... 349/113; 349/38; 349/42; 349/138; 349/114; 257/59; 257/72
(58) Field of Search ................... 349/38, 42, 43, 349/138, 113, 114; 257/59, 72

(56) References Cited

U.S. PATENT DOCUMENTS

| | | | |
|---|---|---|---|
| 5,734,455 A | 3/1998 | Yoshida et al. | 349/122 |
| 5,926,242 A | 7/1999 | Kataoka et al. | 349/113 |
| 5,953,084 A * | 9/1999 | Shimada et al. | 349/38 |
| 6,091,473 A * | 7/2000 | Hebiguchi | 349/141 |
| 6,118,506 A * | 9/2000 | Yamazaki et al. | 349/111 |
| 6,452,654 B2 * | 9/2002 | Kubo et al. | 349/114 |

FOREIGN PATENT DOCUMENTS

| | | |
|---|---|---|
| JP | 7-311389 | 11/1995 |
| JP | 10-31231 | 2/1998 |
| JP | 11101992 | 4/1999 |
| JP | 11242226 | 9/1999 |

* cited by examiner

*Primary Examiner*—Tarifur R. Chowdhury
(74) *Attorney, Agent, or Firm*—Antonelli, Terry, Stout & Kraus, LLP

(57) ABSTRACT

A liquid crystal display device has on each pixel region at a liquid-crystal side of one of a pair substrates, a thin film transistor driven by scanning signals from a gate signal line, a pixel electrode to which video signals from a drain signal line are supplied through the thin film transistor, and a capacity element formed between the pixel electrode and a holding capacity electrode. The capacity element is formed such that a semiconductor layer forming the same layer as a semiconductor layer of the thin film transistor, a first insulation film forming the same layer as a gate insulation film of the thin film transistor, the holding capacity electrode, a second insulation film and a metal layer are sequentially. The semiconductor layers and the metal layer are connected to each other. The metal layer is formed as a reflector which occupies a portion of the pixel region.

7 Claims, 8 Drawing Sheets

LIQUID CRYSTAL DISPLAY DEVICE WITH REFLECTOR FORMING PART OF CAPACITY ELEMENT

BACKGROUND OF THE INVENTION

The present invention relates to a liquid crystal display device, and, more particularly, to a so-called partial transmission type liquid crystal display device.

A so-called partial-transmission type liquid crystal display device is a small-sized liquid crystal display device typically used for a mobile phone, for example; and, images on a display surface of this display device are recognized with the use of natural reflection light from the sun or light produced by an incorporated backlight, when necessary.

The display device has a pair of transparent substrates which are arranged in an opposed manner, while sandwiching a liquid crystal therebetween. On a liquid crystal surface side of one transparent substrate, pixel regions are defined by regions which are surrounded by gate signal lines extended in the y direction and arranged in parallel to the x direction and drain signal lines extended in the x direction and arranged in parallel to the y direction. A thin film transistor, which is driven by a scanning signal from one gate signal line, is provided in each pixel region, along with a pixel electrode to which a video signal is supplied from one drain signal line through the thin film transistor. This pixel electrode is, for example, made of a transparent material, such as ITO (Indium-Tin-Oxide).

On the liquid crystal side of the other transparent substrate, an electric field is generated between the pixel electrode and a counter electrode made of a transparent material commonly formed on each pixel region, and the optical transmissivity of the liquid crystal in the pixel regions is controlled by the electric field.

With respect to the respective pixel regions, by providing reflectors made of, for example, metal layers in approximately half of these regions, it becomes possible to give the liquid crystal display device a function which enables it to generate a reflection-type display at portions where the reflectors are provided and a function which enables it to generate a transmission-type display at portions where the reflectors are not provided.

The constitution of this type of liquid crystal display device is disclosed in detail in, for example, Japanese Patent Laid-open No. 101992/1999 and Japanese Patent Laid-open No. 242226/1999.

However, the liquid crystal display device having such a constitution has a complicated structure and requires a large number of man-hours for fabrication; and, hence, it has been often pointed out that the cost thereof is excessive.

SUMMARY OF THE INVENTION

The present invention has been made in view of the above circumstances, and it is an object of the present invention to provide a liquid crystal display device which can reduce the fabrication steps and thereby simplify the fabrication method thereof.

A typical aspect of the invention disclosed in the present application is as follows.

That is, a liquid crystal display device according to the present invention is substantially characterized in that, on each pixel region at a liquid-crystal side of one of the respective substrates which are arranged in an opposed manner, while sandwiching a liquid crystal therebetween, there are provided a thin film transistor, which is driven by a scanning signal from a gate signal line, a pixel electrode to which a video signal from a drain signal line is supplied through the thin film transistor, and a capacity element which is formed between the pixel electrode and a holding capacity electrode.

The capacity element is formed such that a semiconductor layer forming the same layer as a semiconductor layer of the thin film transistor, a first insulation film forming the same layer as a gate insulation film of the thin film transistor, the holding capacity electrode, a second insulation film and a metal layer are sequentially laminated from a substrate side, and the semiconductor layers and the metal layer are connected to each other.

In addition, the metal layer is formed as a reflector which occupies a portion of the pixel region, and, at the same time, it is connected to the pixel electrode which is formed above a third insulation film formed in the pixel region, such that the third insulation film covers the metal layer.

In the liquid crystal display device having such a constitution, the reflector is configured as one electrode of the capacity element. This means that the reflector is formed during the forming of one electrode of the capacity element, so that an increase of the man-hours for fabrication can be suppressed or the man-hours can be reduced.

DESCRIPTION OF THE PREFERRED EMBODIMENTS

An embodiment of a liquid crystal display device according to the present invention will be explained hereinafter in conjunction with the attached drawings.

Figure 3:
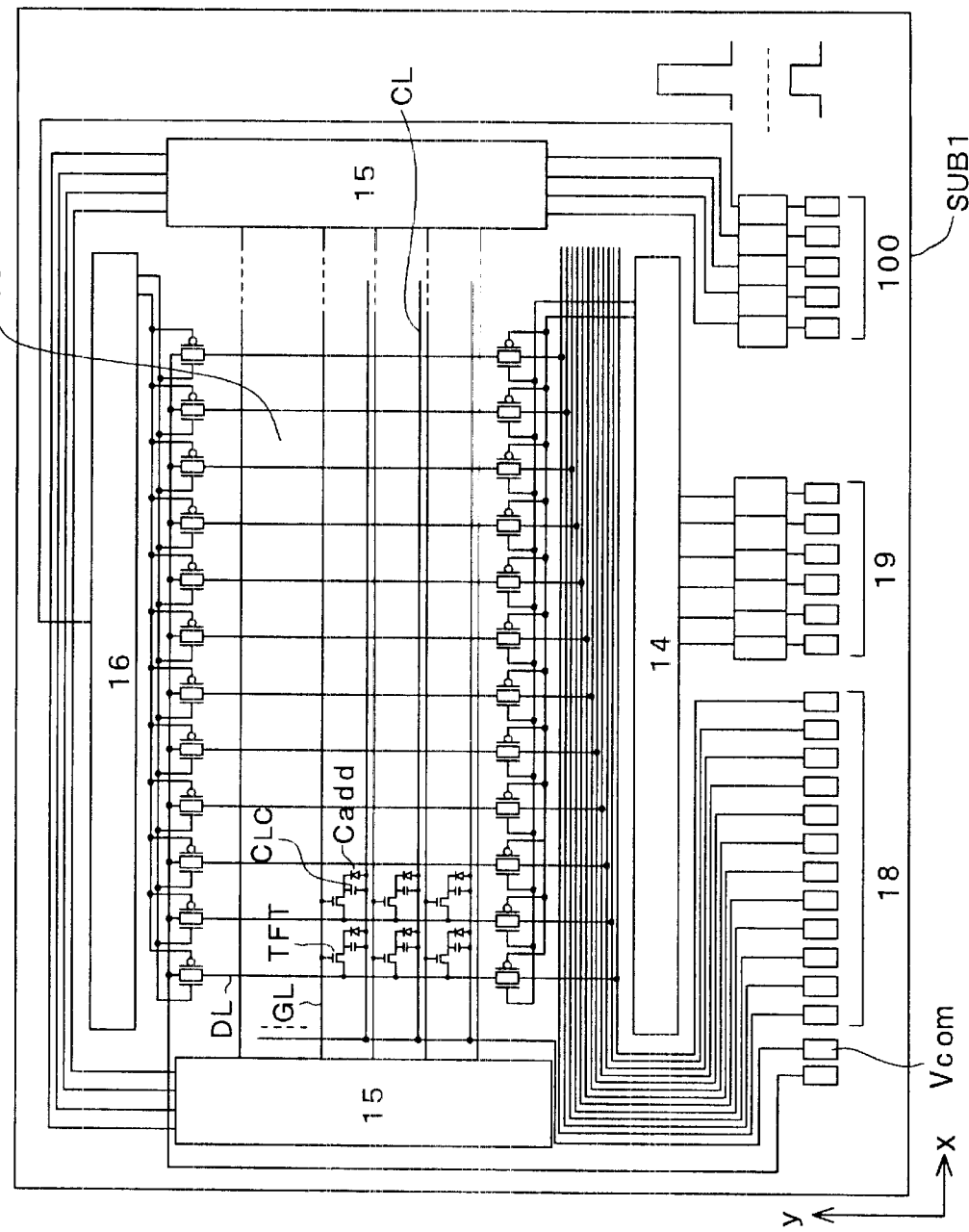
FIG. 3 is an equivalent circuit diagram showing one embodiment of a liquid crystal display device according to the present invention.

FIG. 3 is an equivalent circuit diagram showing one embodiment of a liquid crystal display device according to the present invention. Although the drawing is a circuit diagram, it is drawn corresponding to an actual geometrical arrangement.

In the drawing, a transparent substrate SUB1 is arranged so as to face another transparent substrate (not shown in the drawing) in an opposed manner while sandwiching a liquid crystal therebetween. On a center portion, except for the periphery of the liquid-crystal side surface of the transparent substrate SUB1, gate signal lines GL extend in the x direction and are arranged in parallel to the y direction, and drain signal lines DL extend in the y direction and are arranged in parallel to the x direction. Pixel regions are formed of regions which are surrounded by these respective signal lines GL, DL. A plurality of these pixel regions are arranged in a matrix array thus constituting a display region 13.

Between the gate signal line GL and another neighboring gate signal line GL, a holding capacity electrode wiring CL, which extends in the x direction, is formed, and this holding capacity electrode wiring CL is made to form one capacity holding electrode CT of a capacity element Cadd, which will be explained later with respect to each pixel region.

Each pixel element includes a thin film transistor TFT, which is driven by supply of a scanning signal from one gate signal line GL, and a transparent pixel electrode PIX to which a video signal from one drain signal line DL is supplied through the thin film transistor TFT. Further, the holding capacity element Cadd is formed between the pixel electrode PIX and the holding capacity electrode wiring CL.

Each gate signal line GL has both ends (left and right sides in the drawing) thereof connected to a gate signal line drive circuit 15, which is constituted of a semiconductor integrated circuit mounted on the transparent substrate SUB1 so as to enable the sequential supply of scanning signals outputted from the gate signal line drive circuit 15 to respective gate signal lines GL.

Further, each drain signal line DL has one end (lower-side end in the drawing) thereof connected to a drain signal line drive circuit 14 which is constituted of a semiconductor integrated circuit mounted on the transparent substrate SUB1 so as to enable the supply of video signals matching the timing of the supply of the scanning signal to respective drain signal lines DL.

Finally, the holding capacity electrode wiring CL has one end (left side in the drawing) thereof connected to a terminal Vcom. This terminal Vcom is formed in parallel to input terminals 18, 19, 100 formed on the periphery of the transparent substrate SUB1 and is held at the same potential as a transparent counter electrode (not shown in the drawing) common to respective pixel regions on a liquid-crystal side surface of the other transparent substrate, which is arranged in an opposed manner to the transparent substrate SUB1.

In the drawing, numeral 16 indicates a precharge circuit for charging the drain signal lines DL, numeral 17 indicates a level shift circuit which provides the digital signals (control signals) inputted to input terminals 19, 100 with a voltage level sufficient to drive the gate signal line drive circuit 15 and the drain signal line drive circuit 14.

Figure 1:
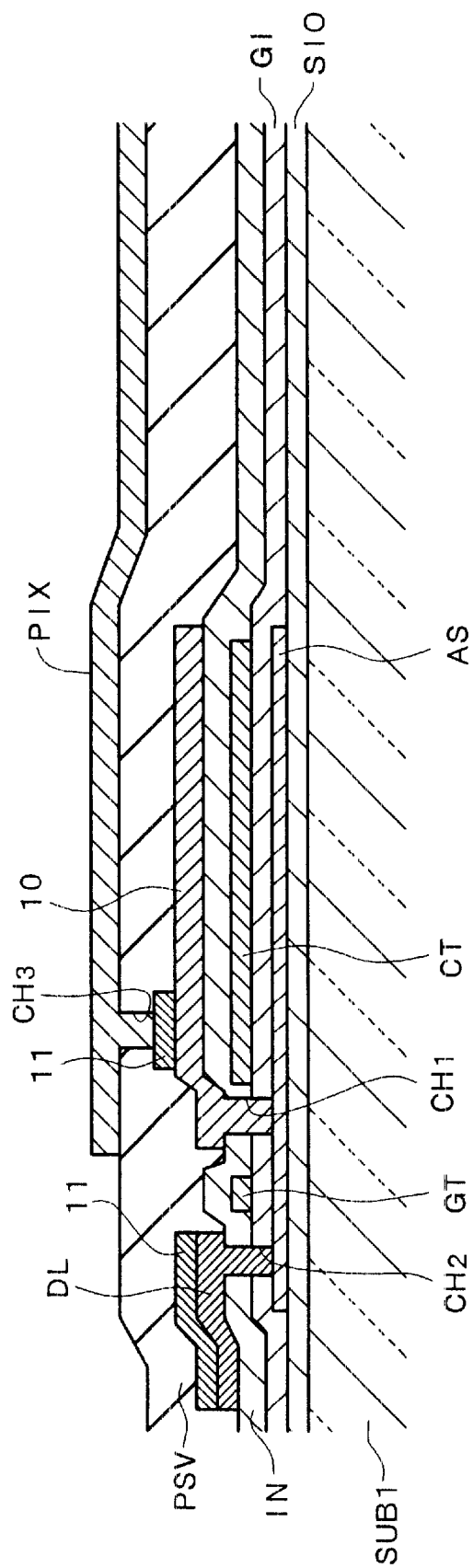
FIG. 1 is a cross-sectional view, showing one embodiment of a pixel of a liquid crystal display device according to the present invention, as seen along line I—I in FIG. 2.
Figure 2:
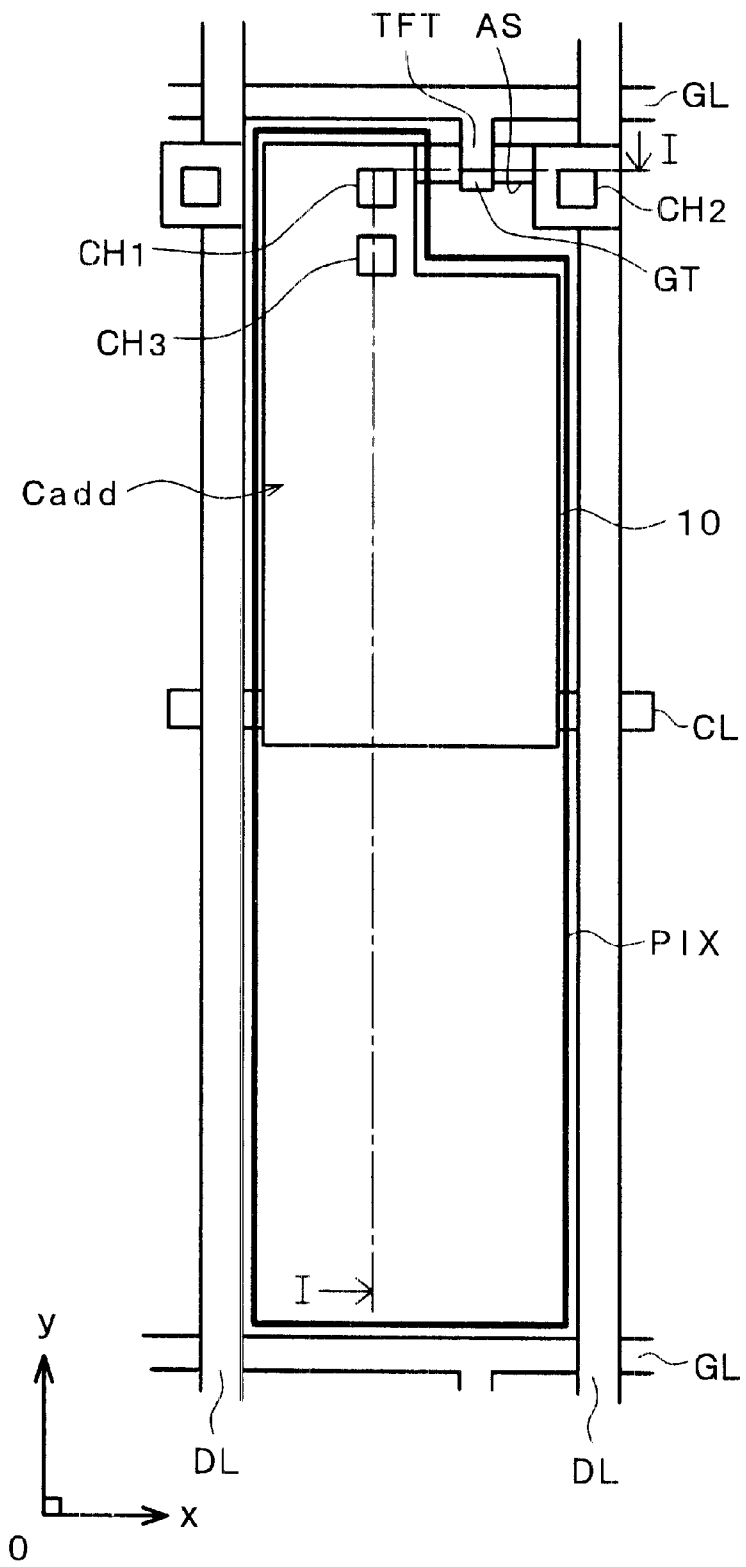
FIG. 2 is a plan view showing one embodiment of a pixel of a liquid crystal display device according to the present invention.

FIG. 2 is a plan view showing one embodiment of the pixel region of the liquid crystal display device according to the present invention, and FIG. 1 shows a cross section taken along a line I—I in FIG. 2. FIG. 2 illustrates the constitution of one pixel region out of respective pixel regions which constitutes the display region 13 shown in FIG. 3. Accordingly, respective pixel regions which are arranged in the left and right direction as well as in the up and down direction relative to this pixel region also have the same constitution.

In FIG. 1 and FIG. 2, first of all, on a liquid-crystal side surface of the transparent substrate SUB1, a background layer S10 is formed, consisting of a single layer or laminated films made of $SiO_2$ or SiN. This background layer S10 is formed for preventing ionic impurities contained in the transparent substrate SUB1 from giving adverse effects to a thin film transistor TFT, which will be explained later.

Then, on a surface of this background layer S10, a semiconductor layer AS made of a polysilicon layer, for example, is formed. This semiconductor layer AS is, for example, made of a material formed by polycrystallizing an amorphous Si film which is formed by a plasma CVD apparatus using an exciter laser. This semiconductor layer AS consists of a strip-like portion formed adjacent to the gate signal lines GL which will be explained later, and a rectangular portion which is integrally formed with the strip-like portion and occupies approximately half (an upper-side half in the drawing) of the pixel region. The strip-like portion of the semiconductor layer AS of the strip-like portion is formed as a semi conductor layer of the thin film transistor TFT, which will be explained later, and the rectangular portion of the semiconductor layer AS is formed as one electrode out of a pair of electrodes of the capacitor elements Cadd, which will be explained later.

Then, on the surface of the transparent substrate SUB1 on which the semiconductor layer AS is formed, a first insulation film G1 is formed, which is made of, for example, $SiO_2$ or SiN and also covers the semiconductor layer AS. This first insulation film G1 functions as a gate insulation film of the thin film transistor TFT and also functions as one of interlayer insulation films between the gate signal lines GL and the drain signal lines DL, which will be explained later, and one of dielectric films of the capacitor element Cadd, which will be explained later.

Then, on the surface of the first insulation film G1, the gate signal lines GL are formed so as to extend in the x direction and be arranged in parallel to the y direction. These gate signal lines GL define the rectangular pixel region together with the drain signal lines DL, which will be explained later. Here, the gate signal lines GL may be made of any conductive film having the desired heat resistance, and, for example, Al, Cr, Ta, TiW and the like can be selected as the material of the conductive film. In this embodiment, the gate signal lines GL are made of TiW.

The gate signal lines GL have respective portions thereof which extend into the inside of the pixel region and these portions are superposed on the strip-like semiconductor layer As, such that the portion intersects the semiconductor layer As. An extension portion GL of the gate signal line GL is formed as a gate electrode GT of the thin film transistor TFT.

Here, after forming the gate signal lines GL, ion implantation of impurities is performed through the first insulation film G1 so as to make the region of the semiconductor layer AS, except for a portion right below the gate electrode GT, conductive, whereby the source region and the drain region of the thin film transistor TFT can be formed; and, at the same time, one electrode out of a pair of electrodes of the above-mentioned capacity element Cadd is formed.

Further, on the upper surface of the first insulation film G1 at the center of the pixel region, a holding capacity electrode wiring CL is formed such that the wiring CL extends in the x direction in the drawing. This holding capacity electrode wiring CL is integrally formed with a holding capacity electrode CT extending to the upper side region of the pixel region in the drawing. This holding capacity electrode wiring CL (holding capacity electrode CT) is formed as the same layer as the gate signal lines GL and is made of the same material as the gate signal lines GL.

On the upper surface of the first insulation film G1, a second insulation film IN is formed, such that the film IN also covers the above-mentioned gate signal lines GL and the holding capacity electrode wiring CL (holding capacity electrode CT). The second insulation film IN is, for example, made of $SiO_2$ or SiN. Further, on the upper surface of the second insulation film IN, a metal film 10, which is made of aluminum (Al), is formed such that the metal film 10 occupies approximately a half region (an upper-side region in the drawing) of the pixel region. This metal film 10 is connected to the semiconductor layer AS through contact hole CH, formed in the second insulation film IN and the first insulation film G1 at the portion adjacent to the thin film transistor TFT.

The semiconductor layer AS which is connected with the metal film 10 forms a portion which corresponds to a source region of the thin film transistor TFT. On the other hand, the drain region of the thin film transistor TFT is a region of the semiconductor layer AS opposite to the gate electrode GT, while sandwiching a portion which is superposed with the gate electrode GT, and is connected with the drain signal lines DL, which will be explained later through contact hole $CH_2$.

Further, the metal film 10 is approximately extended to the center portion of the pixel such that the metal film 10 is superposed on the holding capacity electrode CT. That is, this metal film 10 constitutes a reflector which forms a reflection-type pixel region and also constitutes the other electrode of the capacity element Cadd.

The capacity element Cadd constitutes a two-stage capacity element in which a first capacity element, which uses the holding capacity electrode CT as one electrode, the rectangular semiconductor layer AS as the other electrode and the first insulation film G1 as the dielectric film, and a second capacity element, which uses the holding capacity electrode CT as one electrode, the metal film 10 as the other electrode and the second insulation film IN as a dielectric film, are connected in parallel between the source region and the holding capacity electrode CT of the thin film transistor TFT (see FIG. 1).

Further, on the upper surface of the second insulation layer IN, the drain signal lines DL, which are extend in the y direction and are arranged in parallel to the x direction, are formed. These drain signal lines DL define the pixel region together with the gate signal lines GL.

The drain signal lines DL are made of, for example, aluminum, aluminum which uses TiW as a background layer thereof or aluminum which uses MoSi as a background layer thereof. When aluminum directly comes into contact with the polysilicon layer, it may give rise to the poor conductance at a process temperature of not less than 400° C., for example, and hence, it is effective to provide the background layer. These drain signal lines DL have portions thereof connected with the drain region of the thin film transistor TFT (the side of the thin film transistor TFT which is connected to the drain signal lines DL is called the drain region in this specification) through the contact hole $CH_2$ formed in the second insulation film IN and the first insulation film G1.

Then, a third insulation film PSV is formed on the upper surface of the second insulation film IN such that the film PSV also covers the drain signal lines DL and the metal film 10. The third insulation film PSV is made of, for example, $SiO_2$ or SiN. However, the third insulation film PSV may be formed by coating an organic film or the like. When the third insulation film PSV is formed by coating the organic film or the like, the surface can be made flattened so that it becomes possible to make the orientation of the liquid crystal have a favorable state.

A pixel electrode PIX made of ITO (Indium-Tin-Oxide) film, for example, is formed on the upper surface of the third insulation film PSV. In this case, when the third insulation film PSV is formed of the organic film, the occurrence of pin holes in the film can be largely suppressed; and, hence, an advantageous effect is achieved in that damage to the metal film 10 at the time of performing a patterning to form the pixel electrode PIX of the ITO film can be prevented.

This pixel electrode PIX is connected with the metal film 10 through the contact hole CH, formed in the third insulation film PSV at a portion adjacent to the thin film transistor TFT. Due to such a constitution, the pixel electrode PIX is connected with the source region of the thin film transistor TFT through the metal film 10, and, when the thin film transistor TFT is turned on, the video signals from the drain signal lines are supplied to the pixel electrode PIX through the thin film transistor TFT. On the surface of the metal film 10 at the connecting portion with the pixel electrode PIX, an interposed layer 11 is selectively formed. When aluminum (Al) or the like, for example, is used as material of the metal film 10, the contact between the metal film 10 and the ITO film which constitutes the pixel electrode PIX is not favorable. Accordingly, to improve such a contact, a metal, such as molybdenum silicon (MoSi), titanium tungsten (TiW) or the like, is inserted as the interposed layer 11.

In this case, although it is desirable to form the interposed layer 11 on the whole region of the metal film 10 in view of the fabrication steps, the interposed layer 11 is selectively formed in a fixed range centering around the connecting portion thereof with the pixel electrode PIX in this embodiment. The interposed layer 11 is provided in this way because, since the metal film 10 is made to function as a reflector, if the interposed layer 11 were to be formed on the whole region of the metal film 10, the light reflectance is likely to be decreased due to the interposed layer 11.

Based on the above, it becomes possible to select a material having a large reflectance as the metal film 10 and to make the metal film 10 obtain the reliable connection with the pixel electrode PIX.

Further, in this embodiment, a conductive member made of the same material as the interposed layer 11 is formed such that the conductive member is superposed on the drain signal lines DL. However, it is needless to say that the interposed layer 11 is not always necessary.

Here, the pixel electrode PIX is provided for generating an electric field between the pixel electrode PIX and a transparent counter electrode, which is formed on a liquid-crystal side surface of the other transparent substrate (not shown in the drawing) common to respective pixel regions, which is arranged in an opposed manner to the transparent substrate SUB1 on which the pixel electrode PIX is formed through the liquid crystal; and, the optical transmissivity of the liquid crystal is controlled by this electric field.

In the liquid crystal display device having such a constitution, the metal film 10, which functions as the reflector, is constituted such that it does not directly come into contact with the liquid crystal; and, the third insulation film PSV and the pixel electrode PIX made of a material which is hardly oxidized are interposed between the metal film 10 and the liquid crystal.

Accordingly, the liquid crystal display device has a constitution which hardly generates the type of cell action which may be generated when the liquid crystal is interposed between the metal film 10 and the other metal; and, hence, an advantageous effect that the deterioration of the liquid crystal derived from the cell action can be prevented.

Figure 4A:
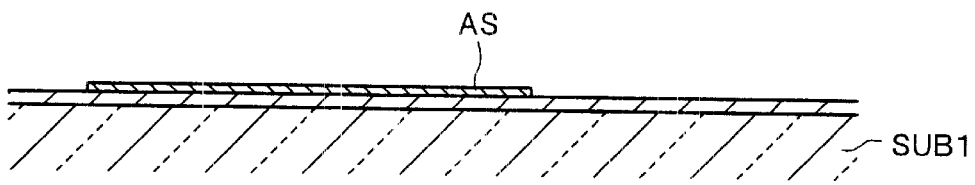
FIGS. 4A to 4H are cross-sectional views showing successive steps in a method of fabricating of a liquid crystal display device according to one embodiment of the present invention.

An example of the fabrication method of the abovementioned liquid crystal display device will be explained in conjunction with FIGS. 4A to 4H. Step 1 (FIG. 4A)

Figure 4B:
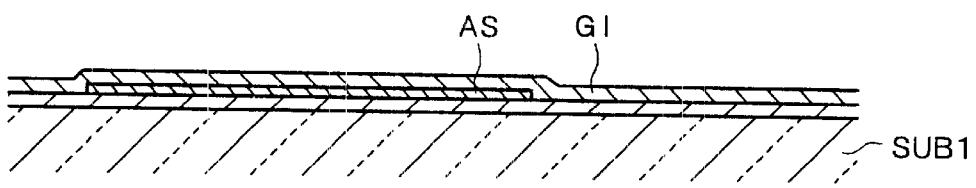

The transparent substrate SUB1, having the background layer SIO formed on a main surface thereof, is prepared. The polysilicon layer is formed on the whole region of the surface of the background layer S10, and the semiconductor layer AS is formed into a given pattern using a selective etching method based on a photolithography technique. In this case, the polysilicon layer is a so-called intrinsic semiconductor layer which is not doped with impurities. Step 2. (FIG. 4B)

Figure 4C:
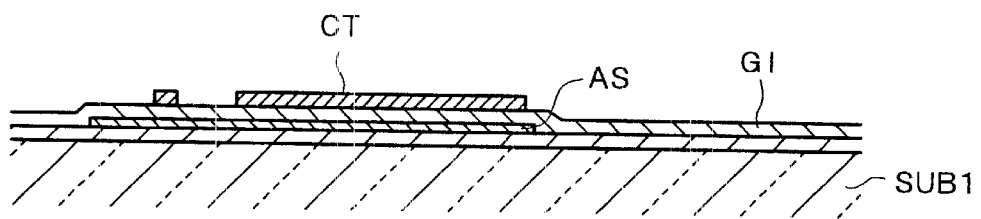

The first insulation film G1, made of, for example, $SiO_2$ is formed on the whole area of the upper surface of the transparent substrate SUB1, such that the first insulation film G1 also covers the semiconductor layer AS. Step 3. (FIG. 4C)

For example, a TiW layer is formed on the whole area of the upper surface of the transparent substrate SUB1 and is formed into a given pattern using a selective etching method based on a photolithography technique, thus forming the signal lines GL and the holding capacity electrode (holding capacity electrode CL). Then, the semiconductor layer AS, which forms a layer below the first insulation film G1 is doped with impurities, for example, by implanting ions into the surface of the first insulation film G1 on which such gate signal lines GL and the like are formed.

Figure 4D:
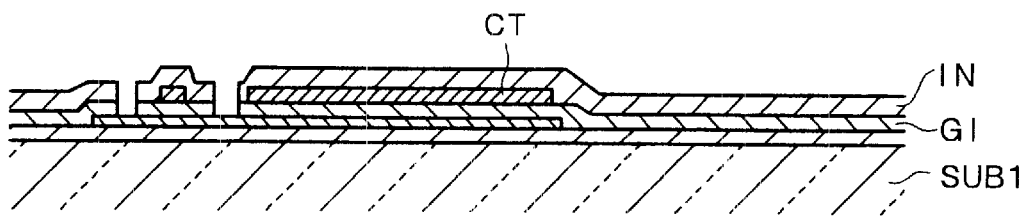

In the semiconductor layer AS, a portion thereof on which the gate electrode GT is formed constitutes a region which is not doped with impurities, since the gate electrode GT works as a mask, while other regions are doped with impurities. That is, in the semiconductor layer AS, a channel region of the thin film transistor TFT is formed of the portion on which the gate electrode GT is formed, and the source region and the drain region are formed at both sides of the channel region. Further, on the other region, one electrode of the holding capacity element Cadd, which is connected to the source region of the thin film transistor TFT, is formed. Step 4. (FIG. 4D)

Figure 4E:
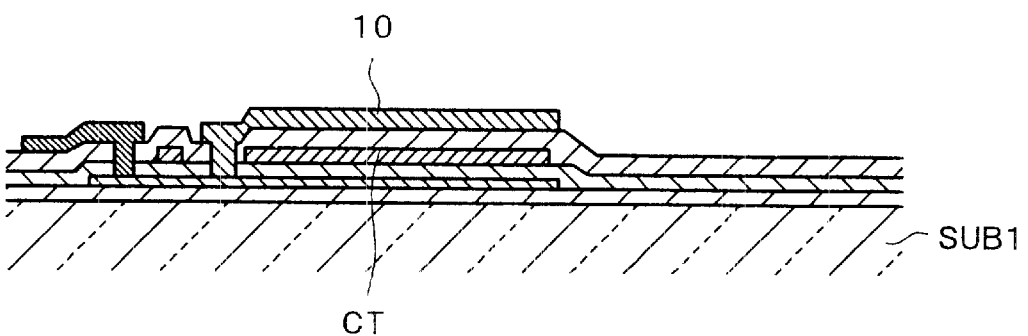

The second insulation film IN, which is made of $SiO_2$, for example, is formed on the whole area of the upper surface of the transparent substrate SUB1, such that the second insulation film IN also covers the holding capacity electrode CT and the like. Thereafter, a contact hole $CH_1$, which penetrates the second insulation film IN and the first insulation film G1, which forms a layer below the second insulation film IN, is formed using a selective etching method based on a photolithography technique. Step 5. (FIG. 4E)

Figure 4F:
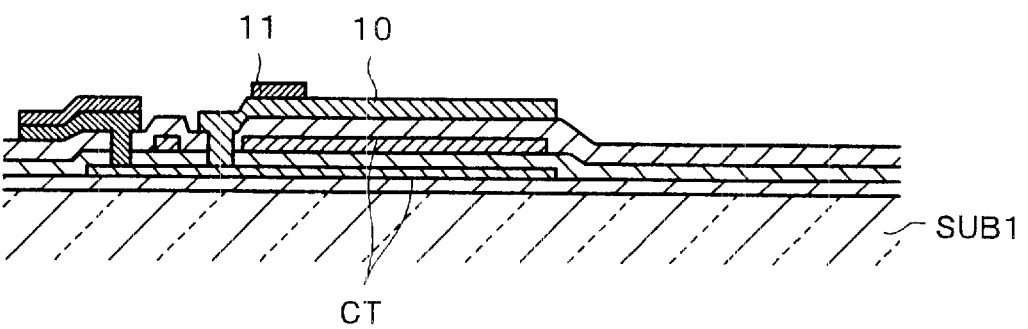

On the whole area of the upper surface of the transparent substrate SUB1, for example, aluminum (Al) which uses TiW as the background layer is formed, and this layer is formed into a given pattern using a selective etching method based on a photolithography technique so as to form the drain signal lines DL and the metal film 10. Step 6. (FIG. 4F)

Figure 4G:
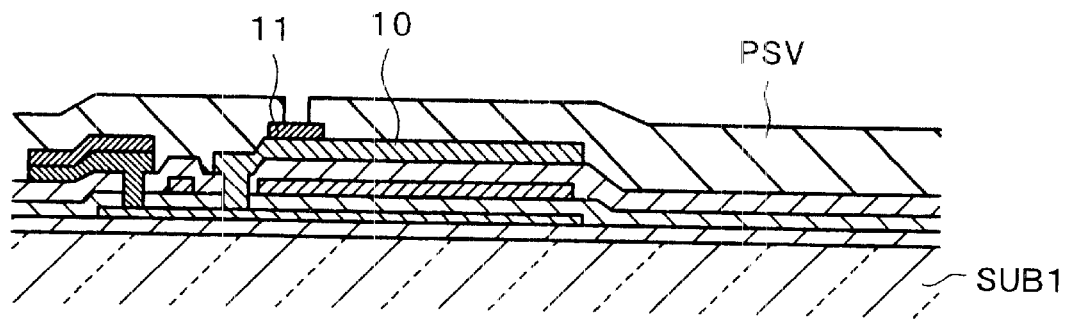

A metal layer made of molybdenum silicon (MoSi), for example, is formed on the whole area of the upper surface of the transparent substrate SUB1, and the interposed layer 11 is selectively formed using a selective etching based on a photolithography technique. Step 7. (FIG. 4G)

Figure 4H:
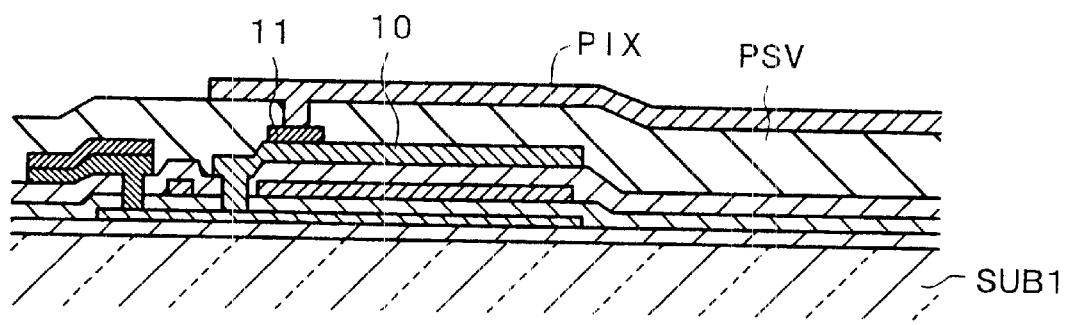

The third insulation film PSV made of resin material, for example, is formed on the whole area of the upper surface of the transparent substrate SUB1. Thereafter, the contact hole $CH_3$, which penetrates the third insulation film PSV, is formed by a selective etching method based on a photolithography technique, and a portion of the interposed layer 11 is exposed from the contact hole $CH_3$. Step 8. (FIG. 4H)

The ITO film is formed on the whole area of the upper surface of the transparent substrate SUB1. Thereafter, the ITO film is formed into a given pattern using a selective etching method based on a photolithography technique so as to form the pixel electrode PIX. This pixel electrode PIX is connected with the interposed layer 11 through the contact hole $CH_3$.

In the method of fabrication of the liquid crystal display device having such a constitution, the metal film 10 is arranged to be used as one electrode of the holding capacity element Cadd as well as the reflector. Accordingly, it is no longer necessary to form a metal film to be used as a reflector and a metal film to be used as one electrode of the holding capacity element Cadd in separate steps as in the case of the conventional method, and, hence, an advantageous effect is achieved in that the man-hours required for fabrication can be reduced.

Embodiment 2

Figure 5A:
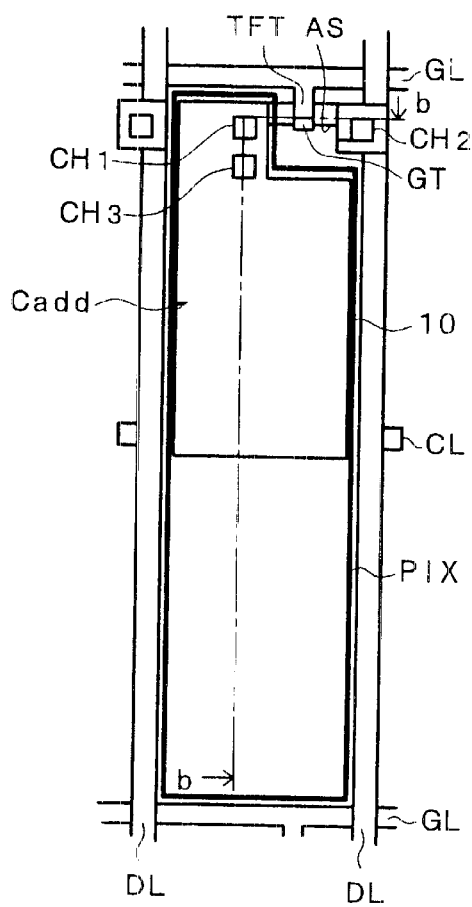
FIG. 5A is a plan view showing another embodiment of a liquid crystal display device according to the present invention; and, FIG. 5B is a cross-sectional view taken along line b—b in FIG. 5A.
Figure 5B:
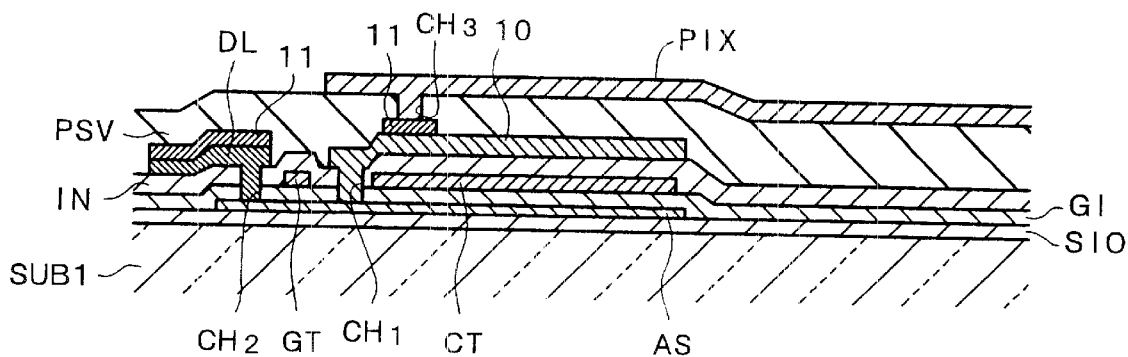

FIGS. 5A and 5B are diagrams showing another embodiment of the liquid crystal display device according to the present invention, wherein FIG. 5A is a plan view corresponding to FIG. 2 and FIG. 5B is a cross-sectional view taken along a line b—b of FIG. 5A.

In FIGS. 5A and 5B, a constitution which differs from the constitution shown in FIG. 2 is shown in that the metal film 10, which also functions as a reflector, is formed such that the metal film 10 is slightly extended to the transmission-type pixel region, so that the metal film 10 is mounted astride a stepped portion which is apparently formed on the surface of the second insulation film IN by the electrodes (AS, CT), which constitute the holding capacity element Cadd.

The liquid crystal display device formed in this manner is advantageous when priority is given to the image of a reflection display. Further, it also brings about an advantageous effect in that the deterioration of a display due to poor orientation of the liquid crystal at the stepped portion becomes more difficult to recognize with the naked eye in the case where the stepped portion is formed of a light reflection region, than it is in the case where the stepped portion is formed of a light transmission region.

Embodiment 3

Figure 6A:
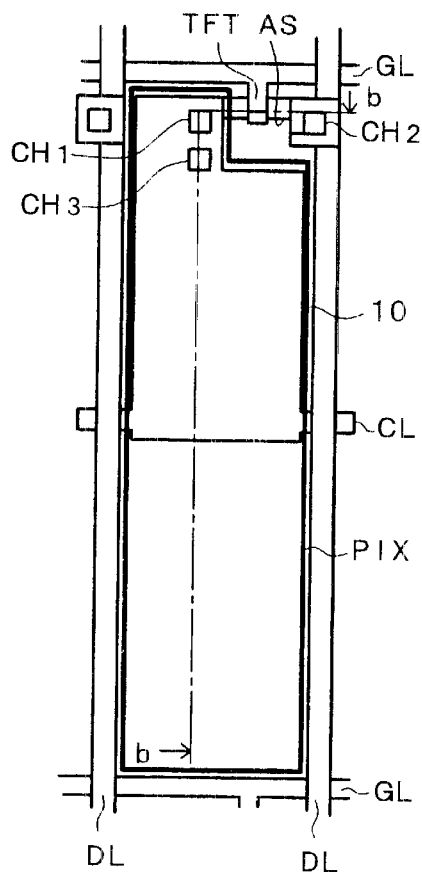
FIG. 6A is a plan view showing still another embodiment of a liquid crystal display device according to the present invention; and, FIG. 6B is a cross-sectional view taken along line b—b in FIG. 6A.
Figure 6B:
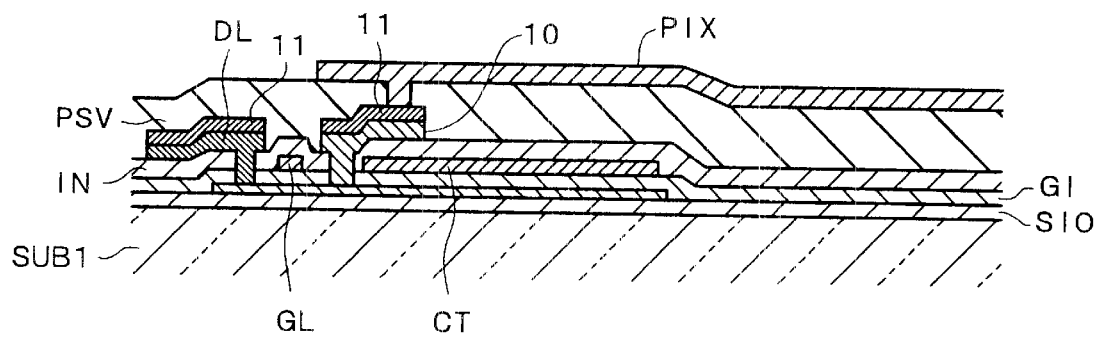

FIGS. 6A and 6B are diagrams showing another embodiment of the liquid crystal display device according to the present invention, wherein FIG. 6A is a plan view corresponding to FIG. 2, and FIG. 6B is a cross-sectional view taken along a line b—b of FIG. 6A.

In FIGS. 6A and 6B, a constitution which differs from the constitution shown in FIG. 1 is shown in which the gate signal lines GL and the holding capacity electrode CT are formed of a material having high light reflectance, such as aluminum, silver or the like, for example so as to make the holding capacity electrode CT function as a reflector.

In this case, since the metal film 10, which is made to function as the reflector in FIG. 1, has only the function of a relay layer for enabling the connection between the semiconductor layer AS and the pixel electrode PIX, the metal film 10 is not extended to the center portion of the pixel region and is merely formed in the periphery of the contact hole $CH_1$.

As opposed to the cases of the above-mentioned respective embodiments, the holding capacity element Cadd does not have a multiple-stage constitution, and adopts a single stage constitution where the first insulation film G1 is formed as the dielectric film, one electrode is formed as the semiconductor layer AS, and the other electrode is formed as the holding capacity electrode CT.

Further, in this embodiment, the metal film 10 has an area small enough to prevent a large intrusion into the inside of the pixel region, so that the interposed layer 11, which enhances the connection between the metal film 10 and the pixel electrode PIX, is formed on the whole area of the metal film 10 and is superposed on the drain signal lines DL with the same pattern. Accordingly, respective material layers formed in two layers can be formed by adopting a selective etching method based on a photolithography technique once, so that an increase in the fabrication man-hours can be avoided.

As can be clearly understood from the above explanation, according to the liquid crystal display device of the present invention, since the reflector can be simultaneously formed with one electrode of the capacity element, the fabrication steps can be decreased.

Further, since the liquid crystal display device is constituted such that the connection between the reflector and the pixel electrode is performed through an interposed layer which is selectively provided, material having a large reflectance can be selected as the reflector, and, at the same time, the reliability of the connection between the reflector and the pixel electrode can be enhanced.

Still further, since the liquid crystal display device is constituted such that the reflector is formed as a layer disposed below the insulation film, which is covered with the pixel electrode, it becomes possible to provide a constitution which hardly generates cell action between the reflector and other metal elements, so that the deterioration of the liquid crystal derived from the cell action can be suppressed.

What is claimed is:

1. A liquid crystal display device being characterized in that
a thin film transistor which is driven by scanning signals from a gate signal line, a pixel electrode to which video signals from a drain signal line are supplied through the thin film transistor, and a capacity element which is formed between the pixel electrode and a holding capacity electrode are provided to each pixel region at a liquid-crystal side of one of respective substrates which are arranged in an opposed manner while sandwiching a liquid crystal therebetween,
the capacity element is formed such that a semiconductor layer forming the same layer as a semiconductor layer of the thin film transistor, a first insulation film forming the same layer as a gate insulation film of the thin film transistor, the holding capacity electrode, a second insulation film and a metal layer are sequentially laminated from a substrate side, and the semiconductor layer and the metal layer are connected to each other, and
the metal layer is formed as a reflector which occupies a portion of the pixel region.

2. A liquid crystal display device being characterized in that
a thin film transistor which is driven by scanning signals from a gate signal
line, a pixel electrode to which video signals from a drain signal line are supplied through the thin film transistor, and a capacity element which is formed between the pixel electrode and a holding capacity electrode are provided to each pixel region at a liquid-crystal side of one of respective substrates which are arranged in an opposed manner while sandwiching a liquid crystal therebetween,
the capacity element is formed such that a semiconductor layer forming the same layer as a semiconductor layer of the thin film transistor, a first insulation film forming the same layer as a gate insulation film of the thin film transistor, the holding capacity electrode, a second insulation film and a metal layer are sequentially laminated from a substrate side, and the semiconductor layer and the metal layer are connected to each other, and
the metal layer is formed as a reflector which occupies a portion of the pixel region and, at the same time, is connected to the pixel electrode which is formed above a third insulation film formed in the pixel region such that the third insulation film covers the metal layer.

3. A liquid crystal display device according to claim 2, wherein the metal layer is connected with the pixel electrode through a contact hole formed in the third insulation film, and the connection between the metal layer and the pixel electrode is performed through a conductive layer which is selectively formed on the metal layer.

4. A liquid crystal display device according to any one of claim 1 and claim 2, wherein the pixel region is defined by a region which is surrounded by a plurality of gate signal lines which are extended in one direction and are arranged in the direction which intersects the one direction and a plurality of drain signal lines which intersect the gate signal lines and are arranged parallel to each other, and the holding capacity electrode is formed as the same layer as the gate signal lines.

5. A fabrication method of a liquid crystal display device in which a capacity element and a reflector are formed on a portion in the inside of a pixel region at a liquid crystal side of one substrate out of respective substrates which are arranged in an opposed manner while sandwiching a liquid crystal therebetween, the fabrication method comprising steps of:
a step for forming a semiconductor layer on the one substrate, a step for forming a first insulation film which also covers the semiconductor layer, a step for forming a holding capacity electrode on the first insulation film such that the holding capacity electrode is superposed on at least a portion of the semiconductor layer, a step for forming a second insulation film such that the second insulation film also covers the holding capacity electrode, and a step for forming a metal layer on the second insulation film such that the metal layer is connected to the semiconductor layer while being superposed on at least the holding capacity electrode,
wherein the capacity element includes the semiconductor layer, the first insulation layer, the holding capacity electrode, the second insulation layer, and the metal layer which is formed as a reflector.

6. A fabrication method of the liquid crystal display device according to claim 5, wherein a thin film transistor is formed in the inside of the pixel region at the liquid crystal side of one substrate and the semiconductor layer is formed as the same layer as a semiconductor layer which constitutes the thin film transistor.

7. A liquid crystal display device being characterized in that a thin film transistor which is driven by scanning signals from a gate signal line, a pixel electrode to which video signals from a drain signal line are supplied through the thin film transistor, and a capacity element provided to each pixel region at a liquid-crystal side of one of respective substrates which are arranged in an opposed manner while sandwiching a liquid crystal therebetween, the capacity element is formed such that a semiconductor layer forming the same layer as a semiconductor layer of the thin film transistor, a first insulation film forming the same layer as a gate insulation film of the thin film transistor, and a holding capacity electrode are sequentially laminated from a substrate side, and the holding capacity electrode is formed as a reflector which occupies a portion of the pixel region, and a light reflection type region and a light transmission type region are provided respectively to each pixel region, and a connection between the pixel electrode and the thin film transistor is performed in the inside of the light reflection type region.

* * * * *